(12) United States Patent
Taylor

(10) Patent No.: US 8,905,345 B2
(45) Date of Patent: Dec. 9, 2014

(54) FIXED SPOOL FISHING REEL

(71) Applicant: Adam Richard Ellis Taylor, Loughton (GB)

(72) Inventor: Adam Richard Ellis Taylor, Loughton (GB)

(73) Assignee: Fox International Group Limited, Hainault Essex (GB)

( * ) Notice: Subject to any disclaimer, the term of this patent is extended or adjusted under 35 U.S.C. 154(b) by 47 days.

(21) Appl. No.: 13/627,337

(22) Filed: Sep. 26, 2012

(65) Prior Publication Data

US 2014/0084097 A1    Mar. 27, 2014

(51) Int. Cl.
*A01K 89/01* (2006.01)
*A01K 89/00* (2006.01)

(52) U.S. Cl.
CPC ............. *A01K 89/00* (2013.01); *A01K 89/0105* (2013.01)
USPC ............................ 242/255; 242/263; 242/282

(58) Field of Classification Search
USPC .................................. 242/255, 257, 263, 282
See application file for complete search history.

(56) References Cited

U.S. PATENT DOCUMENTS

| | | | | |
|---|---|---|---|---|
| 3,600,964 A | * | 8/1971 | Sarah | 74/339 |
| 3,675,502 A | * | 7/1972 | Sarah | 74/369 |
| 4,524,923 A | * | 6/1985 | Tunoda et al. | 242/245 |
| 4,560,118 A | * | 12/1985 | Weber et al. | 242/255 |
| 5,110,066 A | * | 5/1992 | Toda | 242/255 |
| 5,193,763 A | * | 3/1993 | Sakaguchi | 242/255 |
| 5,690,287 A | * | 11/1997 | Ono | 242/255 |
| 6,672,526 B1 | * | 1/2004 | Bledsoe et al. | 242/255 |
| 6,997,409 B1 | * | 2/2006 | Bledsoe et al. | 242/257 |
| 2004/0004141 A1 | * | 1/2004 | Bledsoe et al. | 242/255 |

* cited by examiner

*Primary Examiner* — Emmanuel M Marcelo
(74) *Attorney, Agent, or Firm* — Clark & Brody

(57) ABSTRACT

A fixed spool fishing reel having a spool shaft with a coaxial hollow rotor shaft rotatable thereabout. The reel is further provided with a handle shaft which extends transversely of and is offset relative to the spool shaft. First and second mutually orthogonal gears are coupled for rotation with the handle shaft, the first gear having an axis of rotation which is transverse of and offset from the spool shaft. Likewise for third and fourth gears, with the third gear being on the opposite side of the spool shaft relative to the first gear. The axis of the third gear is closer to the spool than that of the first gear. Likewise the fourth is closer than the second. The rotor shaft can be driven by the handle shaft selectively via the first or the third gear to change the gearing ratio.

8 Claims, 5 Drawing Sheets

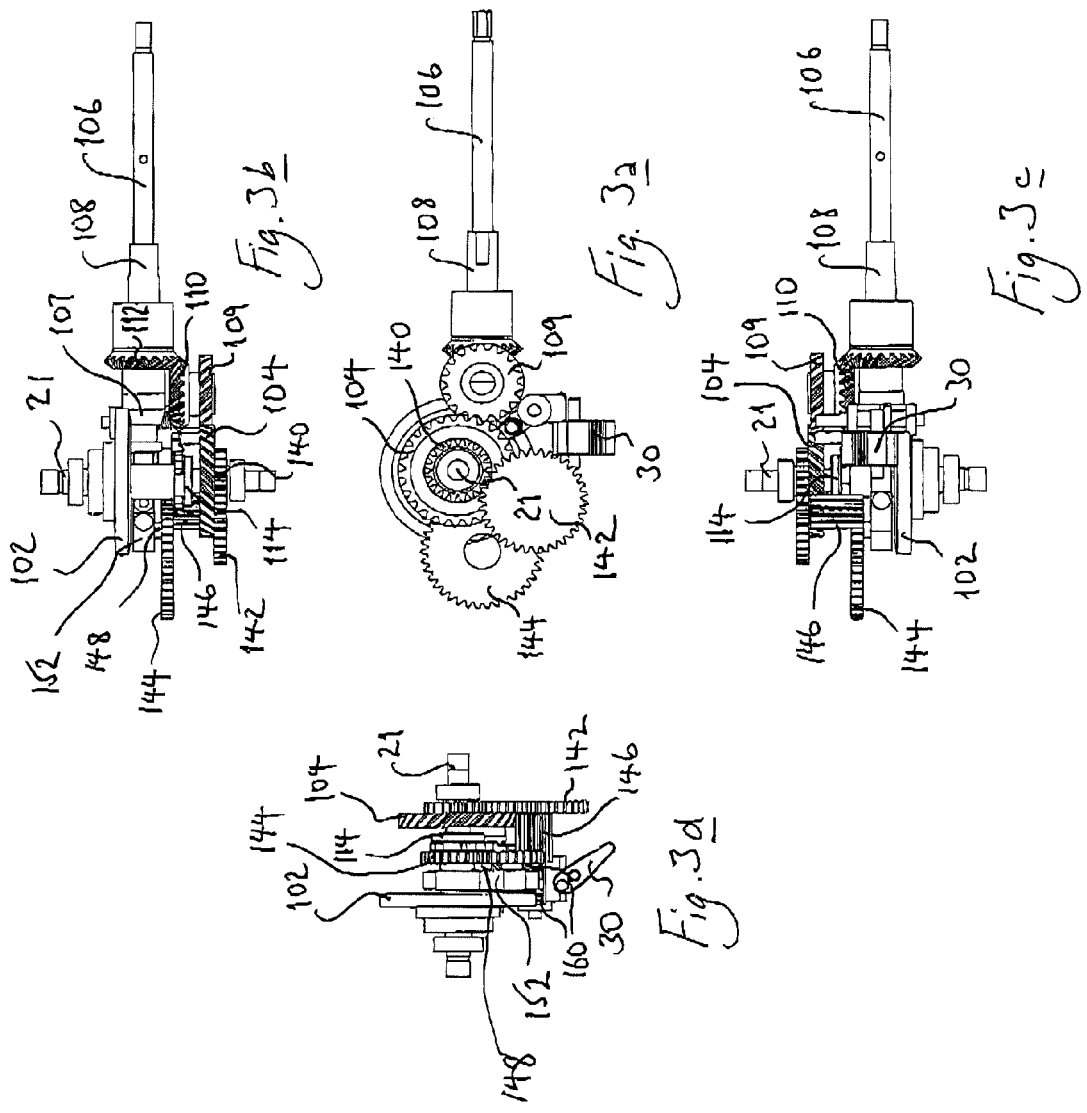

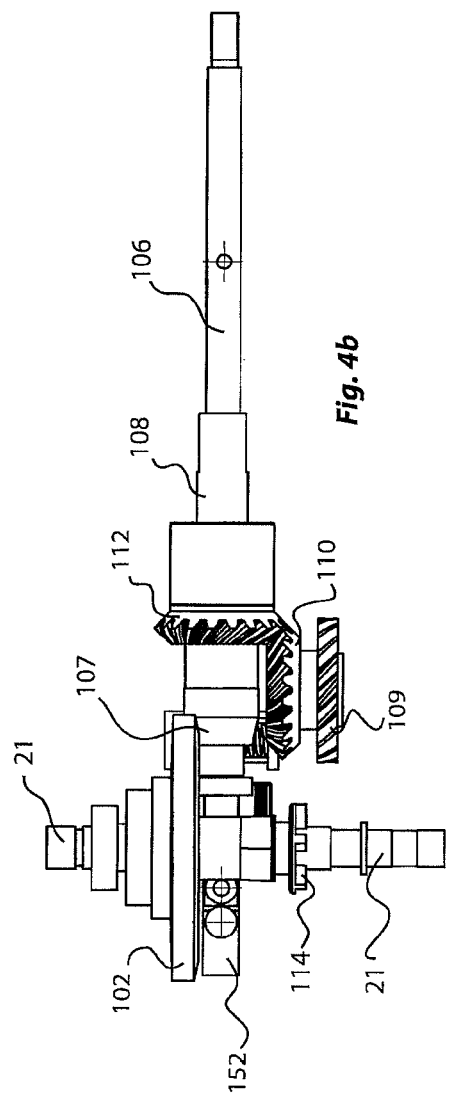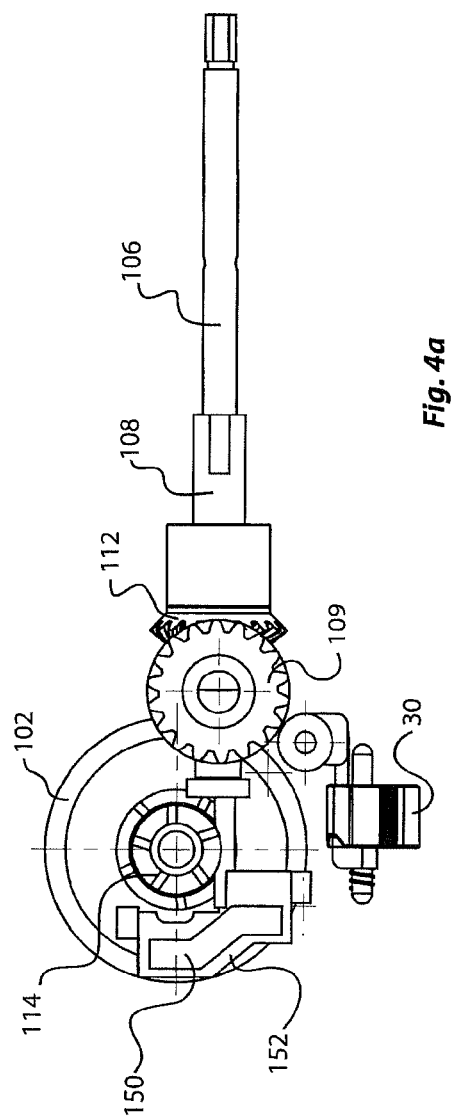

FIXED SPOOL FISHING REEL

The present invention relates to a fixed spool fishing reel having a spool shaft and a hollow rotor shaft which is coaxial with the spool shaft and through which the spool shaft extends, the rotor shaft being able to rotate about the spool shaft, the reel being further provided with a handle shaft which extends transversely of and is offset relative to the spool shaft, there being a first gear coupled for rotation with the handle shaft and also having an axis of rotation which is transverse of and offset from the spool shaft, the said first gear engaging a second gear which is on the rotor shaft so that the respective axes of rotation of the first and second gears are mutually orthogonal.

A problem encountered with such a gear linkage as this is that because the respective axes of rotation of the said first gear and the said second gear are offset from one another there is a limitation imposed on the range of possible gear ratios between the rotation of the handle shaft and that of the rotor shaft. This is especially difficult in a construction of reel intended to provide two selective such gear ratios.

The present invention seeks to provide a remedy.

Accordingly, the present invention is directed to a fixed spool fishing reel having the construction set out in the opening paragraph of the present specification, characterised in that the said first gear is selectively coupled for rotation with the handle shaft and in that the handle shaft is also selectively coupled to drive a third gear, having an axis of rotation which is transverse of and in or substantially in the same plane as the spool shaft, the said third gear being on the opposite side of the spool shaft to that side of the spool shaft on which the said first gear is located, and having an axis of rotation which is closer to the spool of the reel than the axis of rotation of the said first gear, the said third gear engaging a fourth gear which is also on the rotor shaft closer to the spool than is the said second gear, the respective axes of rotation of the said third and fourth gears being mutually orthogonal, and in that the reel has a selector connected to change the gearing through which the handle shaft drives the rotor shaft from that comprising the said first gear and the said second gear, to that comprising the said third gear and the said fourth gear, thereby to change the gear ratio between rotation of the handle shaft and that of the rotor shaft.

An advantage of such a construction is that it enables the reel to have two selective gear ratios for the relative speeds of rotation of the handle shaft relative to the rotor shaft whilst providing a compact and relatively light construction which is relatively simple to manufacture.

These advantages are even more evident if the axis of rotation of the said first gear and the axis of rotation of the handle shaft are one and the same.

The said first gear and the second gear may be bevelled. Likewise, the said third gear and the said fourth gear may be bevelled. This improves the intermeshing of the gears.

The said selector may comprise sliding dogs which can be selectively slid into engagement with respective different gears respectively coupled to the said second gear and the said fourth gear. This enables a compact construction of the reel as a whole.

One of the said different gears may be the said first gear. This reduces the total number of gears required and hence again the weight of the reel is reduced and the compactness of the reel is improved.

Advantageously, the gear ratio between the rotation of the handle shaft and the rotation of the rotor shaft may be changed by the said selector between a gear ratio in the range from 5:1 to 8:1 to a gear ratio in the range from 1.5:1 to 3.5:1.

Preferably, the change in the gear ratio is between a ratio of 6.1:1 and a ratio of 2:1.

An example of a fixed spool fishing reel made in accordance with the present invention will now be described in greater detail with reference to the accompanying drawings, in which:

FIGS. 3a to 3g show respectively side, plan, underneath, end, other side, other end, and perspective views of gearing of the reel shown in FIG. 1;

FIGS. 4a and 4b show side and plan views of the gearing shown in FIGS. 3a to 3g on a different scale, and with parts of what is shown in FIGS. 3a to 3g removed to reveal other parts of the construction of the reel shown in FIG. 1.

Figure 1:
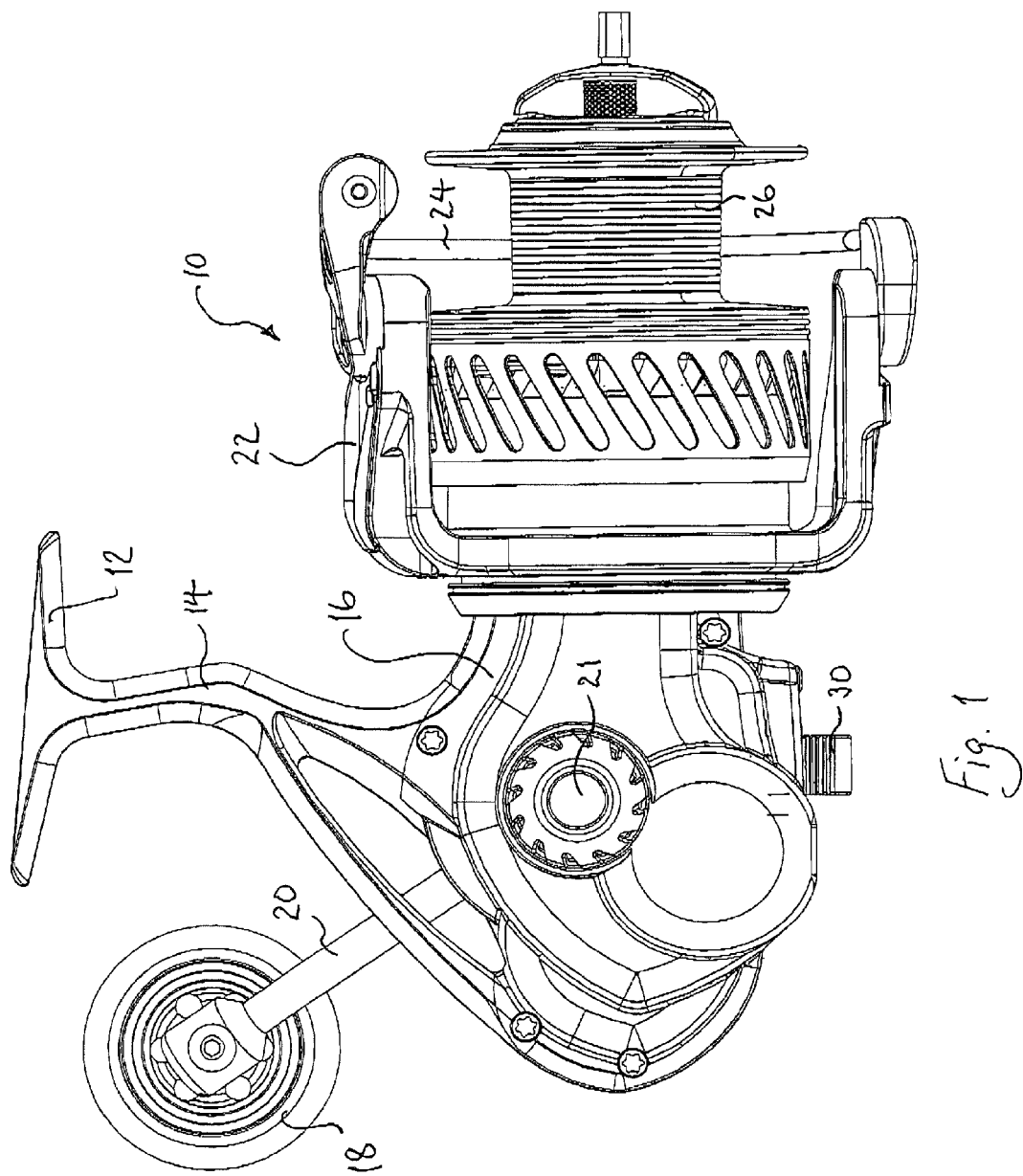
FIG. 1 shows a side view of a fixed spool fishing reel embodying the present invention.

A fixed spool fishing reel 10 shown in FIG. 1 comprises a mounting foot 12, a support arm 14 extending in an intended downward direction from the mounting foot 12 to the reel housing 16, a handle 18 rotatably mounted on a crank 20 connected to a handle shaft 21 which extends transversely through the housing 16, a bail arm 22 with a bail 24, and a skirted spool 26 extending forwardly from the front of the housing 16 with its axis approximately parallel to (in fact at an angle of 6° relative to) the foot 12 and hence to an angling rod to which the reel is attached when the latter is in use.

Figure 2:
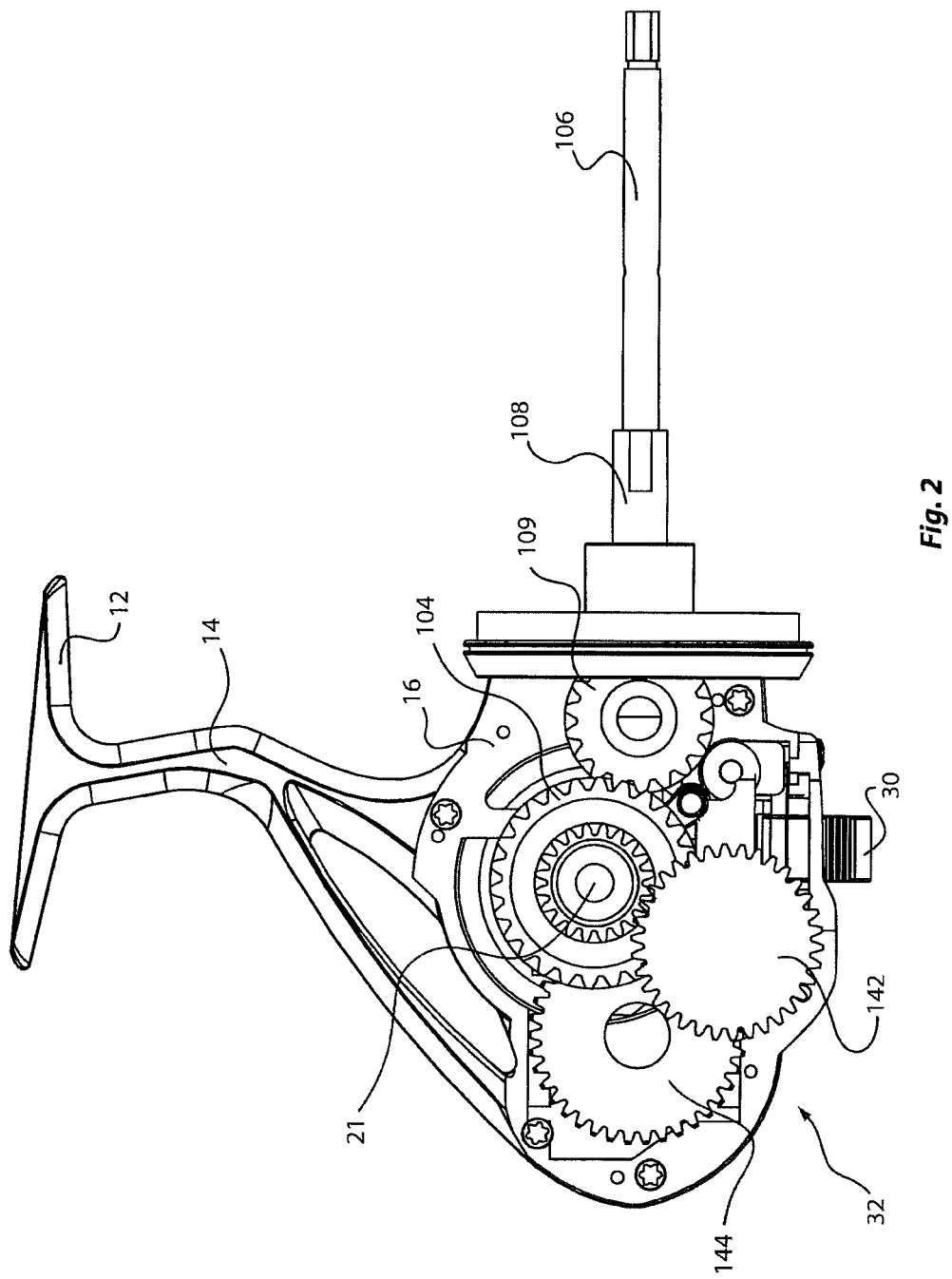
FIG. 2 shows an axial sectional view of parts of the fishing reel shown in FIG. 1.
Figure 3E:
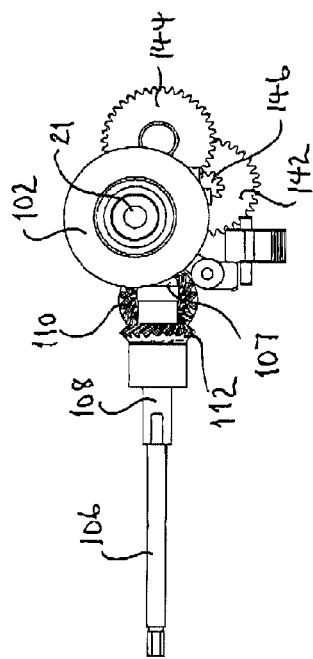
Figure 3G:
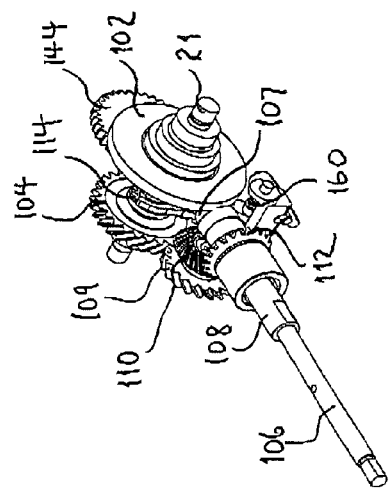
Figure 3F:
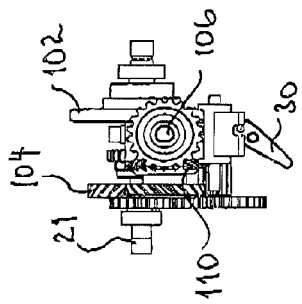

When in use, with fishing line (not shown) wound around the spool 26 and a rig (not shown) attached to the free end of the line, and with the bail arm 24 in a forward open position, the user holds the line against spillage with a finger as he prepares to cast the line and then sharply whips the rod and the reel with the free end of the line on the rigging attached thereto forwardly so that the rigging is cast forwards as the line spills off the front end of the spool. Once the rigging has been cast it drops many hundreds of feet below the surface of the water. The handle 18 is now rotated and the bail arm 24 is swiveled rearwardly to the closed position it has in FIG. 1, to wind the line back on to the spool 26. This is effected by couplings within the housing 16 (not shown in FIG. 1) which simultaneously cause rotation of the bail arm 22 about the axis of the spool 26 and reciprocation of the latter to and fro along its axis. This ensures an even lay of the line 28 on the spool 26. During this phase of operation of the reel, which results in the rigging being lifted towards the surface of the sea very rapidly, the ratio of turns of the bail arm 22 completes six turns for every single turn of the crank 20. In the event that a fish bites on the jigging as it is being raised in this fashion, a user operable lever 30 is now shifted into a second position to change the gearing by way of a gearing mechanism 32 (shown in FIGS. 2 and 3) within the housing 16. This changes the ratio of turns of the bail arm 22 to each turn of the crank 20 from 6.1:1 to 2:1.

Details of the manner in which this change of gear is effected is shown more clearly in FIGS. 3a to 3g.

The handle shaft 21 can be connected by releasable connection devices (not shown) to the handle 18 selectively at either one of its two ends, to provide a right- or left-handed reel. In both cases, the handle shaft 21 extends transversely of the spool shaft 106, and is offset relative thereto.

Two gear wheels 102 and 104 of different respective diameters are attached to the handle shaft 21 so as to be in respective spaced apart fixed positions on the handle shaft 21, but also so as to be rotatable relative thereto and also therewith.

A spool shaft 106 to which the spool 26 is attached extends at right angles to the handle shaft 21, longitudinally of the reel. The two gear wheels 102 and 104 are on opposite respective sides of the spool shaft 106. The gear wheel 102 meshes directly with a gear 107 formed on the end of a hollow rotor shaft 108 which is coaxial with and through which extends the spool shaft 106. Thus the respective axes of rotation of the gears 102 and 107 are mutually orthogonal. The respective diameters of the gears 102 and 107 are such as to give a gear ratio of substantially 6.1:1. The gears 102 and 107 are slightly bevelled.

The gear wheel 104 engages a gear wheel 109, the gears 104 and 109 having substantially parallel respective axes of rotation, and providing a gear ratio of substantially 2:1. The gear wheel 109 is rotationally fast with a bevelled gear wheel 110 which engages a bevelled gear 112 on the rotor shaft 108, the gears 110 and 112 having a 1:1 gear ratio. The gear 110 is on the opposite side of the spool shaft 106 relative to the side of the spool shaft 106 on which the gear 102 is located, and has an axis of rotation which is transverse of and is in, or is substantially in, the same plane as that in which the spool shaft 106 extends. The gears 110 and 112 are forward of the gears 102 and 107, being nearer to the spool 26, and have respective axes of rotation which are mutually orthogonal.

The handle shaft 21 can be selectively coupled either to the gear wheel 102 or to the gear wheel 104 by means of respective sets of dogs, only the set 114 (which engage the wheel 104) of which can be seen in FIG. 3. The lever 30 is coupled to slide the dogs along the handle shaft one way or the other, depending upon the direction in which the user pushes the lever 30, to effect the selection.

Thus, when the lever 30 is in a first position, rotation of the handle shaft 21 effects rotation of the rotor shaft 108 via the gears 102 and 107 to provide a gear ratio of 6.1:1. When the lever 30 is in a second position, rotation of the handle shaft 21 effects rotation of the rotor shaft 108 via the gears 104, 109, 110 and 112 to give an overall gear ratio of 2:1.

Without engagement by its respective set of dogs, the gear wheel 102 or 104 is able to free wheel so that it does not inhibit the action of the gear wheel 102 or 104 which is for the time being engaged by its respective set of dogs.

Whichever of the two gear wheels 102 and 104 is engaged by its respective set of dogs, oscillating motion of the spool shaft 106 along its axis is effected via a gear train comprising a gear wheel 140 which is fixed relative to the gear wheel 104, and a gear wheel 142 which is engaged by the gear wheel 140 to drive a further gear wheel 144 via a splined shaft 146 rotationally fixed to the gear wheel 142. The gear wheel 144 is provided on one side with a spigot 148 which engages an S-slot 150 in a plate 152 at an end of the spool shaft 106 which is further from the spool 26. The spigot 148 and the plate 152 together form an S-drive, to cause longitudinal oscillatory motion of the spool shaft 106.

When the gear wheel 102 is engaged by its associated set of dogs, the gear wheel 104 is driven via the pair of gear wheels 110 and 112. When the gear wheel 104 is engaged by its associated set of dogs, the gear wheel 104 is driven directly by the handle shaft 21. Either way, the ratio of turns of the rotor 22 per oscillation of the spool shaft 106 is the same; in this case just over 12.

The lever 30 is coupled to the sets of dogs via helical compressing springs 160 located in such a fashion that when the lever 30 is operated, the sets of dogs are urged in a direction to change gear, but the gear is only actually changed when the relevant set of dogs meshes with associated parts of the relevant one of the said two gears 102 and 104.

It will be appreciated that switching the lever 30 thereby changes the gearing between the bail arm speed on the one hand and the speed with which the handle 18 is rotated on the other hand. The two ratios either one of which can be selected are 6.1:1 and 2:1.

Numerous variations and modifications to the illustrated reel may occur to the reader without taking the resulting construction outside the scope of the present invention. To give one example only, the gear ratios could be changed.

The invention claimed is:

1. A fixed spool fishing reel having a spool shaft and a hollow rotor shaft which is coaxial with the spool shaft and through which the spool shaft extends, the rotor shaft being able to rotate about the spool shaft, the reel being further provided with a handle shaft which extends transversely of and is offset relative to the spool shaft, there being a first gear coupled for rotation with the handle shaft and also having an axis of rotation which is transverse of and offset from the spool shaft, the said first gear engaging a second gear which is on the rotor shaft so that the respective axes of rotation of the first and second gears are mutually orthogonal, wherein the said first gear is selectively coupled for rotation with the handle shaft and wherein the handle shaft is also selectively coupled to drive a third gear, having an axis of rotation which is transverse of and in or substantially in a plane in which lies the spool shaft, the said third gear being on the opposite side of the spool shaft to that side of the spool shaft on which the said first gear is located, and having an axis of rotation which is closer to the spool of the reel than the axis of rotation of the said first gear, the said third gear engaging a fourth gear which is also on the rotor shaft closer to the spool than is the said second gear, the respective axes of rotation of the said third and fourth gears being mutually orthogonal, and wherein the reel has a selector connected to change the gearing through which the handle shaft drives the rotor shaft from that comprising the said first gear and the said second gear, to that comprising the said third gear and the said fourth gear, thereby to change the gear ratio between rotation of the handle shaft and that of the rotor shaft.

2. A fixed spool fishing reel according to claim 1, wherein the axis of rotation of the said first gear and the axis of rotation of the handle shaft are one and the same.

3. A fixed spool fishing reel according to claim 1, wherein the said first gear and the second gear are bevelled.

4. A fixed spool fishing reel according to claim 1, wherein the said third gear and the said fourth gear are bevelled.

5. A fixed spool fishing reel according to claim 1, wherein the said selector comprises sliding dogs which can be selectively slid into engagement with respective different gears respectively coupled to the said second gear and the said fourth gear.

6. A fixed spool fishing reel according to claim 5, wherein one of the said different gears is the said first gear.

7. A fixed spool fishing reel according to claim 1, wherein the gear ratio between the rotation of the handle shaft and the rotation of the rotor shaft is changeable by the said selector between a gear ratio in the range from 5:1 to 8:1 to a gear ratio in the range from 1.5:1 to 3.5:1.

8. A fixed spool fishing reel according to claim 7, wherein the change in the gear ratio is between a ratio of 6.1:1 and a ratio of 2:1.

* * * * *